United States Patent [19]

Ibori et al.

[11] E Patent Number: Re. 33,519

[45] Reissued Date of Patent: Jan. 15, 1991

[54] METHOD AND APPARATUS FOR CONTROLLING INDUCTION MOTOR

[75] Inventors: Satoshi Ibori, Funabashi; Tadao Shimotu, Sakura; Masatomo Yabu, Itikawa, all of Japan

[73] Assignees: Hitachi, Ltd., Tokyo; Hitachi Keiyo Engineering Co., Ltd., Chiba, both of Japan

[21] Appl. No.: 397,174

[22] Filed: Aug. 22, 1989

Related U.S. Patent Documents

Reissue of:

[64] Patent No.: 4,689,542
Issued: Aug. 25, 1987
Appl. No.: 773,579
Filed: Sep. 9, 1985

[30] Foreign Application Priority Data

Sep. 13, 1984 [JP] Japan ..... 59-190514

[51] Int. Cl.[5] ..... H02P 1/26; H02P 5/40

[52] U.S. Cl. ..... 318/778; 318/798; 318/806

[58] Field of Search ..... 318/727-810, 318/245, 246, 261, 494; 388/813, 901

[56] References Cited

U.S. PATENT DOCUMENTS

| | | | |
|---|---|---|---|
| 4,409,533 | 10/1983 | Kawabata | 318/807 |
| 4,417,193 | 11/1983 | Hirata | 318/808 |
| 4,445,167 | 4/1984 | Okado | 318/811 |
| 4,451,112 | 5/1984 | Hattori et al. | 318/778 |
| 4,546,422 | 10/1985 | Okado | 318/811 X |

*Primary Examiner*—William M. Shoop, Jr.
*Assistant Examiner*—Paul Ip
*Attorney, Agent, or Firm*—Antonelli, Terry, Stout & Kraus

[57] ABSTRACT

When actuating again in induction motor rotating inertially by applying power to the induction motor from an inverter capable of changing both of its output frequency and output voltage, the power is once supplied to the induction motor to increase the residual voltage if the residual voltage of the induction motor is not sufficient, and the frequency of an initial impressed voltage that is in agreement with the rotating speed of the induction motor is determined.

45 Claims, 6 Drawing Sheets

METHOD AND APPARATUS FOR CONTROLLING INDUCTION MOTOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method and apparatus for controlling an induction motor which supplies power from power conversion means capable of changing both if its output frequency $F_1$ and output voltage $V_1$, such as an inverter or a cycloconverter, to an induction motor which is rotating inertially, and reactuates the induction motor.

2. Description of the Prior Art

The necessity of reactuating an induction motor which is rotating inertially develops when instantaneous service interruption occurs.

Such a necessity occurs also when a load which has a large inertia and has been actuated by a commercial power source must be stopped quickly by changing the connection to the actuation by power conversion means capable of changing both of its output frequency and output voltage and by applying regenerative braking.

When power having a frequency remarkably different from the frequency of a residual voltage of an induction motor which is rotating inertially is applied to the induction motor, a large current flows through the induction motor and through the power conversion means. The power conversion means capable of withstanding such a large current is considerably expensive.

Japanese Patent Laid-Open No. 8250/1980 discloses a method which detects the frequency of this residual voltage, brings the initial frequency of the power to be applied from the power conversion means into agreement with this frequency and reactuates the induction motor.

On the other hand, Japanese Patent Laid-Open No. 129198/1982 proposes a method which detects the rotating speed of the induction motor by use of a speed generator, and assumes the frequency of the residual voltage of the induction motor from the output of the speed generator. In order to couple the speed generator to the induction motor, however, a specific work must be applied to the output shaft of the induction motor.

From this aspect, the system which directly detects the residual voltage is advantageous because counter measures can be taken within a control circuit without any specific work for the induction motor. The drawback of this system, however, is that the residual voltage will become zero within a short period of time depending upon the condition of the load, although the induction motor is rotating inertially. If excessive a.c. power is applied to the induction motor during the [intertial] *inertial* rotation when no residual voltage exists, a large load current flows, too.

When the primary side of the induction motor is kept open (equivalent to the cut-off of the power source), the residual voltage Vm on the primary side can be expressed as follows:

$$Vm = M\left(-\frac{1}{T_2} + j\omega\right)\cdot i_{20}\cdot e - \frac{t}{T_2}\cdot e^{j\omega t} \tag{1}$$

where $T_2$ is a secondary time constant and is given by $$T_2 = \frac{L_2}{r_2} \tag{2}$$

M is mutual induction between the primary and secondary sides. $r_2$ is secondary resistance, $L_2$ is secondary inductance, $\omega$ is an angular velocity of rotor, and $i_{20}$ is the initial value of a secondary current.

In eq. (1) described above, the angular velocity $\omega$ of rotation does not drop drastically under the condition that though the inertia of the load, that is, $GD^2$, is great, the load itself is small. Therefore, $$Vm = V_{10}\cdot e - \frac{t}{T_2}\cdot e^{j\omega t} \tag{3}$$

where $V_{10}$ is an effective value of the residual voltage on the primary side immediately after opening of the primary side.

The period of the waveform Vm of the residual voltage at this time greatly depends upon the secondary time constant, and damps with a substantially equal period over a relatively long period as shown in FIG. 1.

On the other hand, under the condition that $GD^2$ of the load is small but the load itself is great, the residual voltage Vm is given by:

$$Vm = V_{10(\omega r)}e - \frac{t}{T_2}\cdot e^{j\omega t} \tag{4}$$

The waveform Vm of the residual voltage at this time is such as shown in FIG. 2, and both the period and the amplitude change drastically, and the waveform damps within a relatively short period.

As is obvious from the description given above, the residual time of the residual voltage greatly depends upon the greatness of the load, the greatness of the inertia of the load and the greatness of the secondary time constant. Even if the load is small and the inertia is great, the residual voltage can not be detected depending upon the length of the service interruption time if the secondary time constant is small, even though the induction motor is rotating inertially.

SUMMARY OF THE INVENTION

In view of the technical background described above, the present invention is directed to provide a method and apparatus for controlling an induction motor which can smoothly actuate again the induction motor irrespective of the greatness of a load, the greatness of an inertia and the greatness of a secondary time constant.

The present invention provides a tentative power supply step for applying to an induction motor such power that the induction motor can generate a residual voltage above a predetermined value $V_2$ for a predetermined period of time Ta during a later-appearing power supply interruption step, if the greatness of the residual voltage is not sufficient after the recovery of power source.

The power supply interruption step described above, which interrupts the supply of the power from power conversion means to the induction motor, is disposed after the tentative power supply step described above, and after the power supply is cut off during this power supply interruption step, the frequency fm of the residual voltage Vm of the induction motor is detected in the period Ta. The procedures then shift to the a real power supply step.

In the real power supply step, the power having a frequency which matches with the induction motor can be applied to the induction motor during the inertial rotation, and the motor can be actuated again without applying an excessively great current to the motor.

It is preferred that in the tentative power supply step, the output voltage $V_1$ be gradually increased from the predetermined value while the output of the power conversion means is being applied to the induction motor. An overcurrent relay is interposed on the input side of a power inverter of the power conversion means, and the frequency and the voltage upon which this overcurrent relay acts are determined. When a 70 V voltage is applied at 50 Hz from the beginning to the induction motor, the overcurrent relay does not operate but when a 100 V voltage is applied at 50 Hz from the beginning, the overcurrent relay does operate.

When the output frequency $F_1$ and the output voltage $V_1$ are gradually and linearly changed from 5 Hz to 15 Hz and 20 V to 60 V, respectively, as in the present invention, the overcurrent relay does not operate.

Generally, the residual voltage Vm has the following relation with the frequency Ff and the output voltage Vf at the time of cut-off of the power source:

$$Vm \propto \frac{V_f}{F_f} \tag{5}$$

Therefore, if the output frequency $F_1$ and the output voltage $V_1$ are gradually increased from the predetermined values while the output of the power conversion means is being applied to the induction motor in the tentative power supply step, the residual voltage can be increased while limiting the current in comparison with the case where a voltage of a predetermined value is applied from the beginning.

Though the above illustrates the control method, the control apparatus of the present invention comprises power conversion means, frequency detection means, residual voltage insufficiency detection means, speed setting means and switching control means.

Among these constituents, the power conversion means can change both the output frequency and the output voltage, and their output terminals are connected to the induction motor. An inverter or a cycloconverter can be used as this power conversion means.

The frequency detection means detects the frequency of the residual voltage of the induction motor.

The residual voltage insufficiency detection means produces a detection signal representing that the residual voltage of the induction motor is zero or small so that the frequency detection means can not detect the frequency.

The speed setting means sets the speed at which the induction motor is desired to be operated. This can be regarded also as the output frequency Fs being set. The switching control means receives the outputs of the frequency detection means, the residual voltage insufficiency detection means and the speed setting means, gradually increases the output voltage $V_1$ to a level in response to the frequency fm while keeping the output frequency $F_1$ of the power conversion means at fm when the frequency detection means detects the frequency fm, and thereafter approaching gradually the output frequency $F_1$ and the output voltage $V_1$ to the output of the speed setting means.

When the residual voltage insufficiency detection means produces the signal representing the insufficiency of the residual voltage, the switching control means applies the output of the power conversion means to the induction motor so that the induction motor produces a residual voltage above a predetermined value $V_2$ for a predetermined period of time Ta even at the time of the interruption of the power supply, and thereafter cuts the power supply from the power conversion means to the induction motor.

DESCRIPTION OF THE PREFERRED EMBODIMENTS

Figure 3:
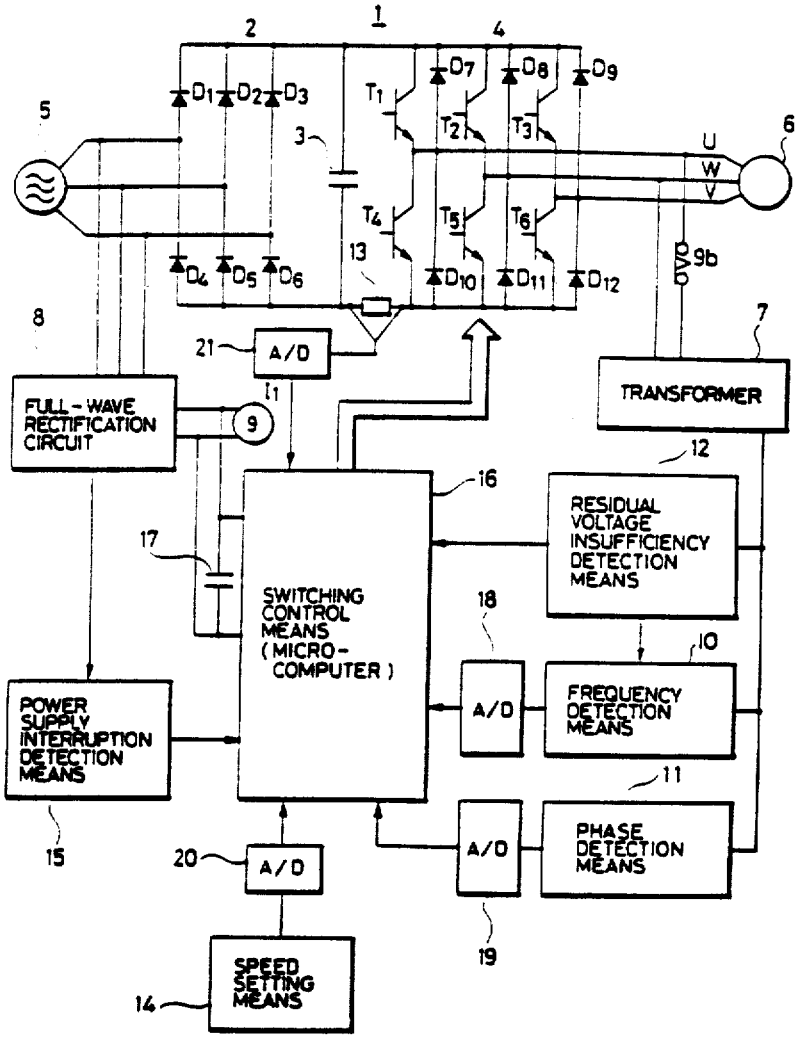
FIG. 3 is a current diagram showing a control apparatus in accordance with one embodiment of the present invention.

In FIG. 3 reference numeral 1 represents power conversion means as a whole. The power conversion means 1 consists of a power rectifier 2, a smoothing capacitor 3 and a power inverter 4. The power rectifier 2 includes six diodes $D_1$–$D_6$ that are connected in a bridge arrangement. The input terminals of this bridge circuit are connected to a three-phase a.c. power source 5. The smoothing capacitor 3 is interposed between the output terminals of the power rectifier 2. The power convertor 4 includes six transistors $T_1$–$T_6$ that are connected antiparallel with one another, and six flywheel diodes $D_7$–$D_{12}$ that are connected antiparallel with the transistors $T_1$–$T_6$, respectively. The output terminals of the power inverter 4 are connected to a three-phase induction motor 6.

Reference numeral 7 represents a transformer which takes out insulatedly the residual voltage of the three-phase induction motor 6 from its primary side. This transformer 7 is connected to the input terminal of the three-phase induction motor 6 via a contact 9b, which is opened at the time of actuation, of an on-delay time 9 connected to the output of a full-wave rectification circuit 8, and takes up the residual voltage of the induction motor 6 for the period of only 2 seconds, for example, at the time of service interruption and after the recovery of the power source, thereby minimizing the power consumption during the operation of the three-phase induction motor 6. Reference numeral 10 represents the frequency detection means for detecting the output frequency of the transformer 7, that is, the frequency fm of the residual voltage, and reference numeral 11 represents the phase detection means for detecting the phase $\alpha$ of the output voltage of the transformer 11. Reference numeral 12 represents the residual voltage insufficiency detection means. This means produces a signal representing that the frequency detection means 10 and the phase detection means 11 can not detect the frequency and the phase because the output of the transformer 7 is zero or because the output is small and does not reach a predetermined value even if it is not zero.

Reference numeral 13 represents a shunt resistor for detecting the input current of the power inverter 4.

Reference numeral 14 represents the speed setting means for setting the operating speed of the three-phase induction motor.

Reference numeral 15 represents power supply interruption detection means for notifying the power supply interruption from the three-phase a.c. power source 5 when the output of the full-wave rectification circuit 8 is below a predetermined value.

Reference numeral 16 represents the switching control means, and the power necessary for this means is obtained from the full-wave rectification circuit 8. A capacitor 17 is connected to the input of this switching control means 16 so that the control means can operate for a period of about 100 msec even when service interruption occurs.

Figure 4A:
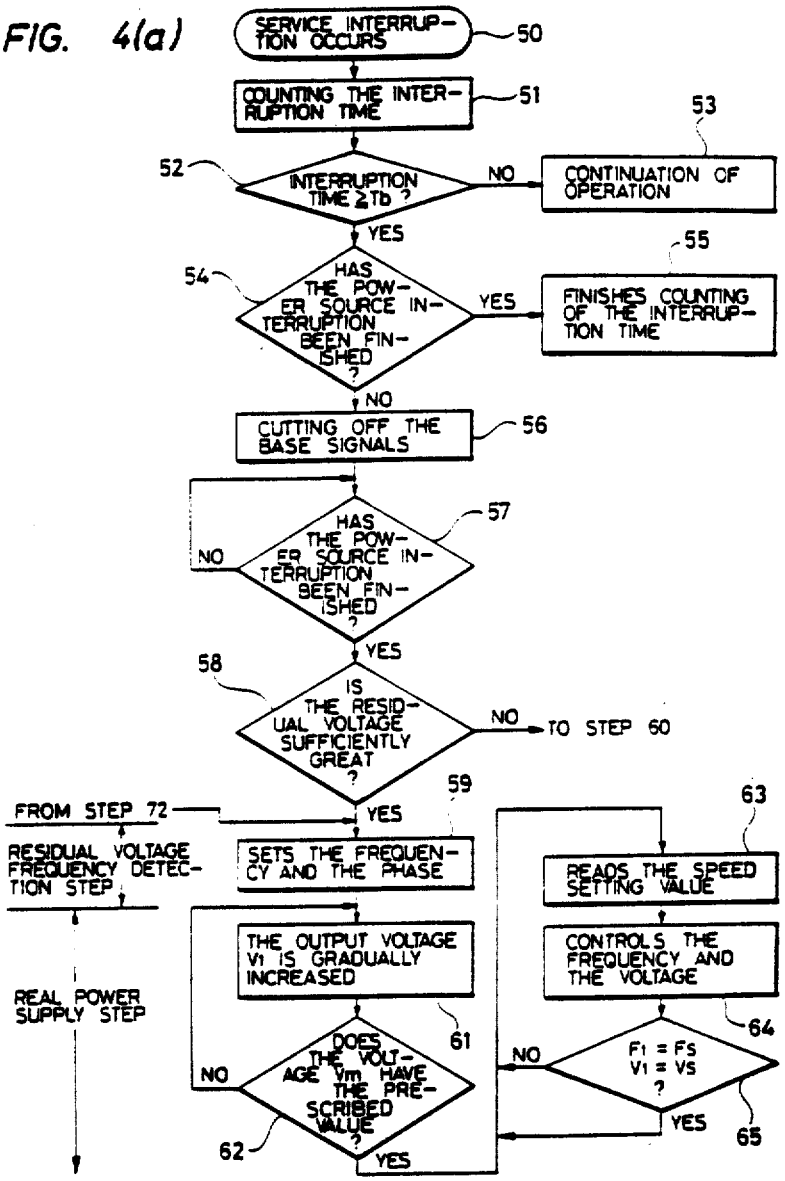
FIGS. 4(a) and 4(b) are flowcharts showing a control method in accordance with one embodiment of the present invention.
Figure 4B:
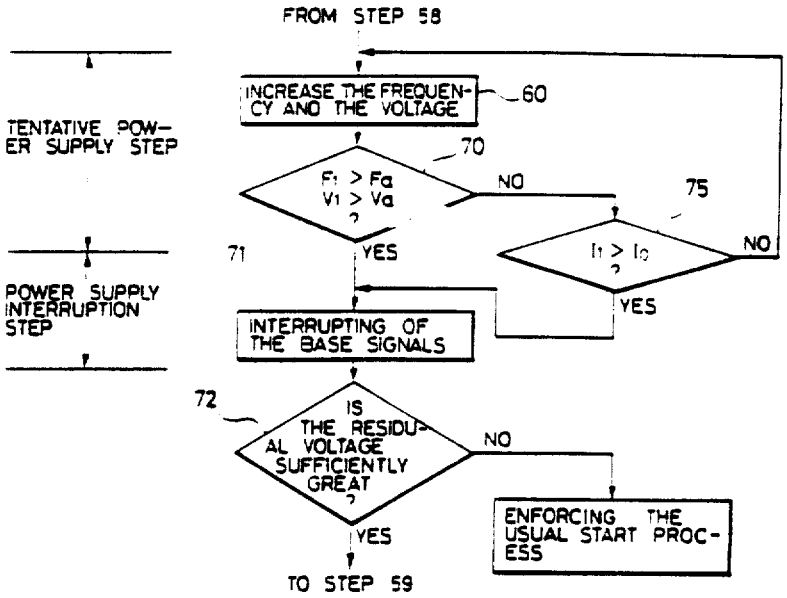

The switching control means 16 consists of a microcomputer, which receives the outputs of the frequency detection means 10, the speed setting means 14 and the shunt resistor 13 through analog-digital conversion circuits 18, 19, 20, 21, respectively, and further receives the signals from the residual voltage insufficiency detection means 12 and the power supply interruption detection means, and operates in accordance with the flowchart shown in FIG. 4.

It will now be assumed that when the three-phase induction motor 6 receives the power from the three-phase a.c. power source 5 through the power conversion means 1 and is rotating at a speed corresponding to the set speed by the speed setting means 14, the service interruption occurs at a step 50. Then, this information is given to the switching control means 16 from the power source interruption detection means 15.

The control means 16 starts counting the output signals of the timing signal generation circuit of its own, which is not shown in the drawing, and starts counting the interruption time as shown at step 51.

The control means 16 then judges at step 52 whether or not this interruption time is longer than a time Tb. As a result, if the service interruption time is shorter than Tb, the procedure moves to step 53 and the operation is continued as such. Tb is a time in which the power stored in the smoothing capacitor 3 can be supplied to the three-phase induction motor 6 even when the service interruption develops, and a suitable time Tb is selected in accordance with the smoothing capacitor 3 and the capacity of the three-phase induction motor 6. An example is from 10 msec to 20 msec and at this value, the size of the smoothing capacitor 3 need not be increased, in particular.

If the service interruption time is found to be equal to, or greater than, Tb as the result of judgement at step 52, the switching control means 16 shifts to step 54, receives the signal from the power supply interruption detection means 15 and judges whether or not the power source interruption has been finished. If the interruption is found to have been completed, the procedure moves to step 55, and finishes counting of the interruption time which is effected at step 51. Thus, the three-phase induction motor 6 keeps operating as if nothing had occurred. If the power supply interruption is found to have not yet been completed as a result of judgement at step 54, the procedure shifts to step 56, whereby the switching control means 16 cuts off the base signals of all the transistors $T_1$–$T_6$.

Even after the base signals are cut off at step 56, the control means 16 receives the signal from the power supply interruption detection means 15 as shown at step 57 and judges whether or not the interruption is completed. If the interruption is found to have not yet been completed, this judgement is repeated with a predetermined time interval. If the interruption is found to have been completed already, the control means 16 shifts to step 58 and receives the signal from the residual voltage insufficiency detection means 12. When the residual voltage insufficiency detection means 12 generates the signal representing that the residual voltage is sufficiently great, the procedure shifts to step 59, and if the detection means 12 produces the signal representing the residual voltage is not sufficiently great, the procedure shifts to step 60.

The contact 9b of the off-delay timer 9 is kept closed for the period of 2 seconds from the completion of the power source interruption after its occurrence so that the residual voltage detection means 12, the frequency detection means 10 and the phase detection means 11 can detect the insufficiency of the residual voltage, the frequency and the phase, respectively.

At step 59, the switching control means 16 reads the frequency of the residual voltage from the frequency detection means 10 and the phase of the residual voltage from the phase detection means, respectively. The control means 16 then sets the frequency and the phase so that the frequency of the power to be supplied from the power inverter 4 to the three-phase induction motor 6 and its phase are in agreement with the frequency fm detected by the frequency detection means 10 and the phase detected by the phase detection means 11, respectively.

The procedure at step 60 will be described later.

After step 59, the switching control means 16 moves to step 61. At this step, the output voltage $V_1$ is gradually increased while the output frequency of the power inverter 4 is kept at fm.

Figure 5:
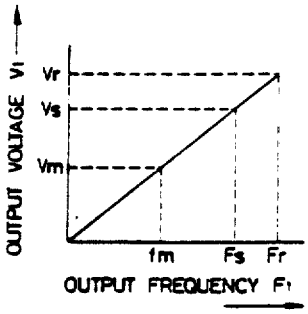
FIGS. 5, 6 and 7 are characteristics diagrams showing different output frequency-vs-output voltage characteristics of power conversion means.
Figure 6:
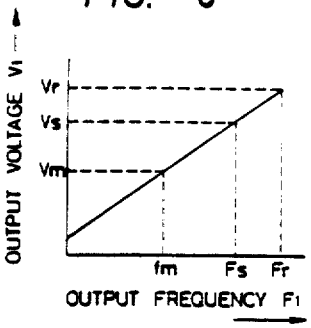
Figure 7:
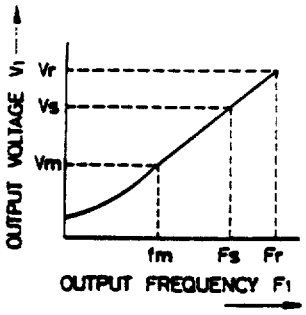

If the three-phase induction motor 6 is controlled so that its output becomes constant irrespective of the speed change, control is made in such a fashion that the ratio of the output frequency $F_1$ of the power inverter 4 to the output voltage $V_1$ becomes constant as shown in FIG. 5. A bias which drops progressively with an increasing output frequency is applied sometimes to the output voltage within a low range of the output frequency $F_1$ as shown in FIGS. 6 and 7. In any way, judgement is made at step 62 whether or not the output voltage of the power inverter 4 rises to the voltage Vm corresponding to the frequency fm which is detected by the frequency detection means 10, and if it is still lower than Vm, the voltage is further increased, and the procedure moves to step 63 when the voltage becomes equal to Vm.

At step 63, the control means 16 reads the signal from the speed setting means 14 and moves to step 64. At this step, the control means 16 controls the frequency F1 and the voltage $V_1$ along the characteristics lines shown in FIGS. 5–7 so that the output of the power inverter 4 attains the frequency Fs and the voltage Vs corresponding to the speed set by the speed setting means 14.

Thereafter the step 65 is followed. Here, comparison is made whether $F_1$ is equal to Fs and the output voltage $V_1$ is equal to Vs. Not only in the case where $F_1=Fs$ and $V_1=Vs$ but also in the case where $F_1 \neq Fs$ and $V_1 \neq Vs$, the procedure returns to step 63 and control is continued so that the speed of the three-phase induction motor 6 reaches the speed set by the speed setting means 14.

Figure 8:
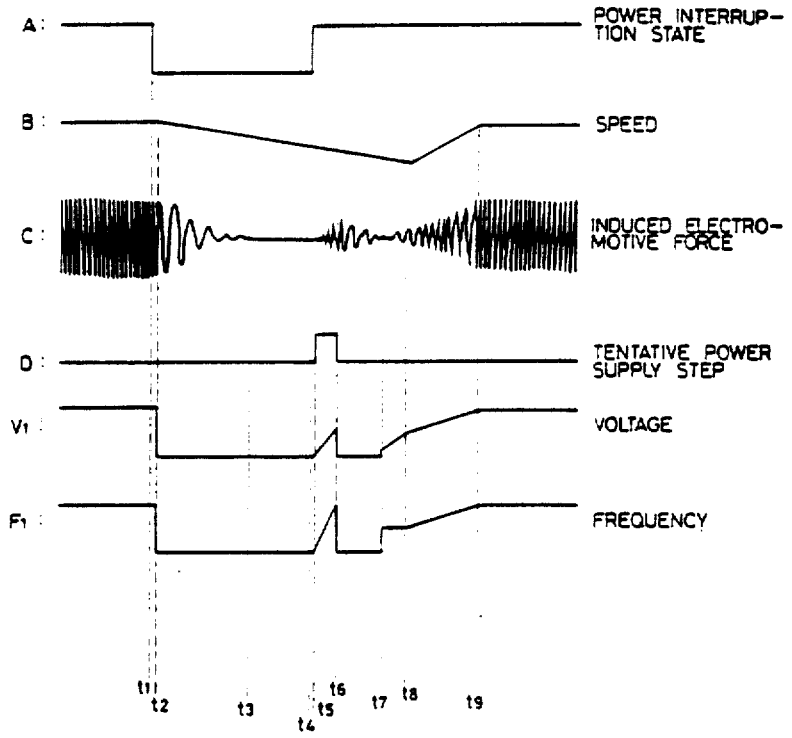
FIG. 8 shows the time chart obtained from executing the method of the present invention.

FIG. 8 shows the time chart when the procedure proceeds to step 60. Here, symbol A represent the power interruption state in which the interruption develops at a point of time $t_1$ in the ON state of the power source, and the power source is again ON at a subsequent point of time $t_4$.

Symbol B represents the speed of the three-phase induction motor 6. Even if the power interruption occurs at the time $t_1$, the speed of the three-phase induction motor 6 does not immediately drop, because the power is supplied from the smoothing capacitor 3 for the period of from 10 to 20 msec. When the time $t_2$ is reached, the power source is forcedly cut off as shown at steps 52 and 54, and hence the output voltage of the power inverter 4 represented by $V_1$ becomes zero, and along therewith, the frequency represented by $F_1$ becomes also zero. The speed of the motor 6 represented by B also drops gradually.

Figure 1:
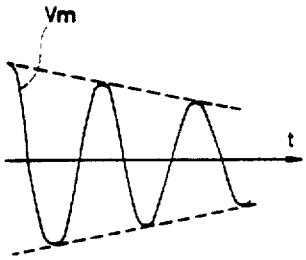
FIGS. 1 and 2 are time charts used for explaining the background of the present invention.
Figure 2:
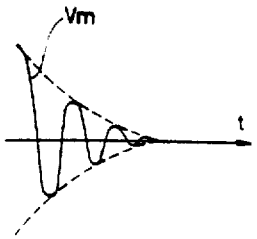

Symbol C represents the induced electromotive force of the induction motor 6. After the cut-off of the power source at the point of time $t_1$, the force is referred to as the "residual voltage", which becomes progressively smaller as shown also in FIGS. 1 and 2, and reaches substantially zero at the time $t_3$.

In FIG. 8, the power source is under the ON state at the time $t_4$ after the residual voltage has substantially reached zero, and the procedure naturally proceeds to step 60 as a result of judgement at step 58.

At step 60, the output frequency $F_1$ and the output voltage $V_1$ are gradually increased from the predetermined values to those values Fa and Va which are necessary for the induction motor 6 to generate a residual voltage above a predetermined value $V_2$ for a predetermined period Ta, while the output of the power conversion means 1 is being applied to the induction motor 6.

At this step 60, the output frequency $F_1$ and the output voltage $V_1$ are gradually increased while keeping the ratio $V_1/F_1$ constant.

It is particularly preferred that when the rated frequency and rated voltage of the induction motor 6 are Fr and Vr, respectively, the output frequency $F_1$ and the output voltage $V_1$ are gradually increased while keeping the condition $V_1/F_1=Vr/Fr$, that is, along the characteristics curve shown in FIG. 5.

Alternatively, it is possible to increase the output frequency $F_1$ and the output voltage $V_1$ to the rated frequency Fr and the rated voltage Vr from $V_1$=positive predetermined value when $F_1=0$, that is, along the characteristics curves shown in FIGS. 6 and 7. At this time, the initial frequency need not be zero but may be from 3 to 5 Hz, for example. Furthermore, the frequency $F_1$ and the voltage $V_1$ may be increased gradually along a characteristics curve obtained by somewhat moving downward the characteristics curve shown in FIGS. 5–7 in parallel therewith.

Experiments reveal that suitable Ta, Va and Fa values are from 0.5 to 3 seconds, at least 30 V and at least 15 Hz, respectively.

The control means 16 proceeds to step 70 after step 60. At this step, whether or not the frequency $F_1$ and the voltage $V_1$ have reached predetermined values Fa and Va is determined.

The tentative power supply step is the combination of these steps 60 and 70. The state at the points $t_5$–$t_6$ in FIG. 8 corresponds to the tentative power supply step. If both the output frequency $F_1$ and the output voltage $V_1$ are found to have reached the predetermined values Fa and Va at step 70, the procedure proceeds to step 71. At this step, the power supply interruption step to cut off the supply of the power from the power conversion means 1 to the induction motor 6 is effected. Cut-off of the power supply from the power conversion means is effected by cutting off the base signals from the switching control means 16 to the transistors $T_1$–$T_6$. The base signal cut-off time is represented by $t_6$–$t_7$ in FIG. 8. After this cut-off of the base signals, step 72 is executed in the time Ta. At step 72, judgement is made whether or not the residual voltage Vm is sufficiently great for the normal operations of the frequency detection means 10 and the phase detection means 11. If it is found to be sufficiently great, the procedure returns to step 59.

The step effected at this step 59 is the residual voltage frequency detection step, and the residual voltage phase detection step is also effected at this step 59. This residual voltage frequency detection step is executed in the period of $t_6$–$t_7$ shown in FIG. 8.

The real power supply step is effected between steps 61 and 65. This state is shown after the point of time $t_7$ in FIG. 8. Particularly, the period between the points $t_8$ and $t_9$ illustrates the result after the execution of the steps 63, 64 and 65, and the period subsequent to the time $t_9$ illustrates the state after the operating state.

When the residual voltage is judged to be not sufficiently great at step 72, the motor 6 is judged as being at halt, and the switching control means 16 gradually raises the frequency and the voltage while keeping the relation shown in FIGS. 5 and 6 in an ordinary manner in order to make start.

Incidentally, if the control means judges at step 70 that both the output frequency $F_1$ and the output voltage $V_1$ are smaller than the predetermined values Fa and Va, the procedure proceeds to step 75 and the control means 16 receives the output signal $I_1$ of the analog-digital converter 21. When the control means 16 judges that the result $I_1$ is greater than the overcurrent detection level $I_o$, the procedure proceeds to step 71. When it is judged to be smaller than the level $I_o$, on the contrary, the procedure returns to step 60.

If the tentative power supply step is not disposed, the motor which is rotating inertially at 330 rpm can not be started again smoothly, but when the tentative power supply step is disposed as described above, the motor rotating inertially at 200 rpm can be started again smoothly.

Figure 9:
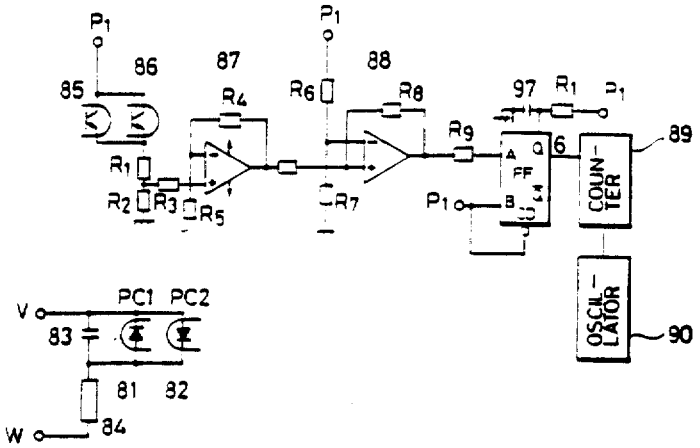
FIG. 9 is a circuit diagram showing the principal portions of the apparatus in accordance with another embodiment of the present invention.
Figure 10:
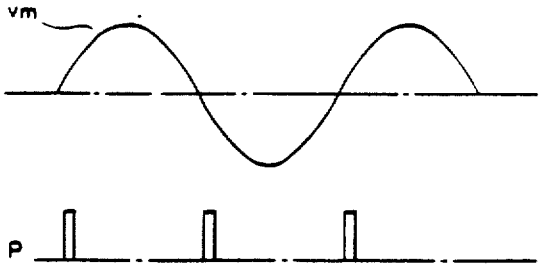
FIG. 10 is a time chart used for explaining the operation of the circuit shown in FIG. 9.

The frequency and the phase of the residual voltage can be detected by use of photo-couplers PC1, PC2 shown in FIG 9 in place of the transformer 7. In other words, light emitting diodes 81, 82 of the photo-couplers PC1, PC2 are connected anti-parallel, and a capacitor 83 is connected parallel to them and are connected to the V and W phases of the three-phase induction motor 6 through a resistor 84. On the other hand, phototransistors 85, 86 of the photo-couplers PC1, PC2 are connected parallel and are connected to flip-flop FF through two comparators 87, 88, so that a pulse P of frequency twice the frequency of the residual voltage Vm can be obtained as shown in FIG. 10. This pulse is applied to, and counted by, a counter 89. Since this counter receives reset signals in every time interval from an oscillator 90, the frequency of the residual voltage can be determined by counting the pulses immediately before resetting is made through a gate circuit not shown in the drawing.

The phase of the residual voltage can be determined from the phase of the signal from the flip-flop FF. When no pulse is generated from the flip-flop FF, it means either that the residual power is not sufficient or that it is zero. When it is desired to increase the number of pulses from the flip-flop FF, photo-couplers may be disposed between the phases of the three-phase induction motor 6.

Symbols $R_1$-$R_{10}$ represent resistors and reference numeral 97 represents a capacitor. A positive potential is applied to the terminal $P_1$.

Although the description given above illustrates the preferred embodiment of the invention, the present invention is not particularly limited thereto, but can be modified in various manners. For example, the control means can be constituted without using the micro-computer. In the tentative power supply step, the output frequency may be increased little by little with the passage of time.

What is claimed is:

1. In a method of actuating an induction motor rotating inertially by supplying power to said induction motor from power conversion means capable of changing both the output frequency $F_1$ and the output voltage $V_1$ thereof, a control method of an induction motor comprising the steps of:

(a) a tentative power supply step for applying power necessary for said induction motor to generate a residual voltage above a predetermined value $V_2$ for a predetermined period Ta, to said induction motor during a later-appearing power supply interruption step;

(b) said power supply interruption step for interrupting the power supply to said induction motor after said tentative power supply step;

(c) a residual voltage frequency detection step for detecting the frequency fm of a residual voltage of said induction motor within said period Ta after the interruption of power supply in said power supply interruption step; and (d) a real power supply step for supplying power having a frequency corresponding to the frequency fm of said residual voltage determined by said residual voltage frequency detection step, to said induction motor from said power conversion means.

2. A control method of an induction motor according to claim 1 wherein said real power supply step supplies a voltage whose initial frequency is fm and which is lower than C×fm, where Fr is a rated frequency of said induction motor and C is Vr/Fr with Vr representing a rated voltage of said induction motor, from said power conversion means to said induction motor, and said voltage is gradually increased towards C×fm while the frequency thereof is kept constant.

3. A control method of an induction motor according to claim 1, wherein said real power supply step supplies a voltage whose initial frequency is fm and which is lower than C×fm, where fm is the frequency of said residual voltage determined by said residual voltage frequency detection step, C is Vr/Fr, Fr and Vr are rated frequency and rated voltage of said induction motor and Fs is an output set frequency of said power conversion means, from said power conversion means to said induction motor, then the voltage is gradually increased towards C×fm while the frequency thereof is kept substantially constant, the frequency is thereafter increased towards Fs and moreover, the voltage is gradually changed to a value corresponding to said frequency Fs.

4. A control method of an induction motor according to claim 1 wherein said residual voltage frequency detection step detects the frequency and the phase of said residual voltage, and said real power supply step supplies power corresponding to said phase from said power conversion means to said induction motor.

5. In a method of actuating an induction motor by supplying, from power conversion means, power capable of changing both the output frequency $F_1$ and the output voltage $V_1$ to said induction motor rotating inertially, a control method of an induction motor comprising the steps of:

(a) a tentative power supply step for increasing gradually said output voltage $V_1$ from a predetermined value to a value necessary for said induction motor to generate a residual voltage above a predetermined value $V_2$ for a predetermined period Ta in a later-appearing power supply interruption step while the output of said power conversion means is being applied to said induction motor;

(b) said power supply interruption step for interrupting the supply of power to said induction motor from said power conversion means, after said tentative power supply step;

(c) a residual voltage frequency detection step for detecting the frequency fm of the residual voltage of said induction motor within said period Ta after the interruption of the supply of power, during said power supply interruption step; and (d) a real power supply step for supplying power having a frequency corresponding to the frequency fm of said residual voltage determined by said residual voltage frequency detection step, to said induction motor from said power conversion means.

6. A control method of an induction motor according to claim 5 wherein said output frequency $F_1$ is also increased gradually in said tentative power supply step.

7. A control method of an induction motor according to claim 6 wherein said output frequency $F_1$ and said output voltage $V_1$ are increased gradually while keeping the ratio $V_1/F_1$ constant in said tentative power supply step.

8. A control method of an induction motor according to claim 6 wherein said output frequency $F_1$ and said output voltage $V_1$ are increased gradually while keeping the condition $V_1/F_1=Vr/Fr$ in said tentative power supply step where Fr is a rated frequency and Vr is a rated voltage of said induction motor.

9. A control method of an induction motor according to claim 6 wherein said output frequency $F_1$ and said output voltage $V_1$ are gradually increased to Fr and Vr, respectively, from $V_1$=a positive predetermined value when $F_1=0$, in said tentative power supply step where Fr is a rated frequency and Vr is a rated voltage of said induction motor.

10. A control method of an induction motor according to claim 5 wherein said residual voltage frequency detection step detects the frequency and phase of said residual voltage, and said real power supply step supplied power corresponding to said phase from said power conversion means to said induction motor.

11. An apparatus for controlling an induction motor, comprising:

power conversion means capable of changing both the output frequency $F_1$ and the output voltage $V_1$ and having the output terminals thereof connected to said induction motor;

frequency detection means for detecting the frequency of a residual voltage of said induction motor;

residual voltage insufficiency detection means for producing a signal representing that said residual voltage is zero or too small and said frequency detection means can not detect the frequency;

speed setting means for setting the speed of said induction motor; and switching control means for receiving the outputs of said frequency detection means, said residual voltage insufficiency detection means and said speed setting means; increasing gradually said output voltage $V_1$ to a level corresponding to a frequency fm while keeping the output frequency $F_1$ of said power conversion means at fm when said frequency detection means detects said frequency fm; then approaching said output frequency $F_1$ and said output voltage $V_1$ to values corresponding to the output of said speed setting means; supplying the output of said power conversion means to said induction motor so that said induction motor can generate a residual voltage above a predetermined value $V_2$ for a predetermined period Ta during later-appearing power supply interruption when said residual voltage insufficiency detection means produces the signal representing the insufficiency of said residual voltage; and thereafter interrupting the supply of power from said power conversion means to said induction motor.

12. An apparatus for controlling an induction motor comprising:

power conversion means capable of changing both the output frequency $F_1$ and the output voltage $V_1$ and having the output terminals thereof connected to said induction motor;

frequency detection means for detecting the frequency of a residual voltage of said induction motor;

phase detection means for detecting the phase of said residual voltage of said induction motor;

residual voltage frequency insufficiency detection means for producing a signal representing that said residual voltage is zero or too small and said frequency detection means can not detect the frequency;

speed setting means for setting the speed of said induction motor; and switching control means for receiving the outputs of said frequency detection means, said residual voltage insufficiency detection means and said speed setting means; bringing the phase of the output of said power conversion means into agreement with $\alpha$ and increasing gradually the output voltage $V_1$ to a value corresponding to said frequency fm while keeping the output frequency $F_1$ at fm when said frequency detection means and said phase detection means detect the frequency fm and the phase $\alpha$, respectively, then approaching gradually said output frequency $F_1$ and said output voltage $V_1$ to values corresponding to the output of said speed setting means; applying the output of said power conversion means to said induction motor so that said induction motor can generate a residual voltage above a predetermined value $V_2$ for a predetermined period Ta during later-appearing power supply interruption if said residual voltage insufficiency detection means produces the signal representing the insufficiency of said residual voltage; and thereafter interrupting the supply of power from said power conversion means to said induction motor.

13. An apparatus for controlling an induction motor comprising:

power conversion means capable of changing both the output frequency $F_1$ and the output voltage $V_1$ and having the output terminals thereof connected to said induction motor;

frequency detection means for detecting the frequency of a residual voltage of said induction motor;

phase detection means for detecting the phase of said residual voltage of said induction motor;

residual voltage frequency insufficiency detection means for producing a signal representing that said residual voltage is zero or too small and said frequency detection means can not detect the frequency;

speed setting means for setting the speed of said induction motor; and switching control means for receiving the outputs of said frequency detection means, said residual voltage insufficiency detection means and said speed setting means; bringing the phase of the output of said power conversion means into agreement with $\alpha$ and increasing gradually the output voltage $V_1$ to a value corresponding to said frequency fm while keeping the output frequency $F_1$ at fm when said frequency detection means and said phase detection means detect the frequency fm and the phase $\alpha$, respectively; then approaching gradually the output frequency $F_1$ and the output voltage $V_1$ to values corresponding to the output of said speed setting means; increasing the output voltage $V_1$ of said power conversion means to a level necessary for said induction motor to produce a residual voltage above a predetermined value $V_2$ for a predetermined period Ta even during later-appearing power supply interruption while applying the output of said power conversion means to said induction motor when said residual voltage insufficiency detection means produces the signal representing the insufficiency of the residual voltage; and thereafter interrupting the supply of power from said power conversion means to said induction motor.

14. A control apparatus for an induction motor comprising:

power conversion means capable of changing both the output frequency $F_1$ and the output voltage $V_1$ and having the output terminals thereof connected to said induction motor;

frequency detection means for detecting the frequency of a residual voltage of said induction motor;

phase detection means for detecting the phase of said residual voltage of said induction motor;

residual voltage frequency insufficiency detection means for producing a signal representing that said residual voltage is zero or too small and said frequency detection means can not detect the frequency;

speed setting means for setting the speed of said induction motor; and switching control means for receiving the outputs of said frequency detection means, said residual voltage insufficiency detection means and said speed setting means; bringing the phase of the output of said power conversion means into agreement with $\alpha$ and increasing gradually the output voltage $V_1$ to a value corresponding to said frequency fm while keeping the output frequency $F_1$ at fm when said frequency detection means and said phase detection means detect the frequency fm and the phase $\alpha$, respectively, then approaching gradually the output frequency $F_1$ and the output voltage $V_1$ to values corresponding to the output of said speed setting means; increasing the output voltage $V_1$ of said power conversion means to a level necessary for said induction motor to produce a residual voltage above a predetermined value $V_2$ for a predetermined period Ta even during later-appearing power supply interruption while applying the output of said power conversion means to said induction motor when said residual voltage insufficiency detection means produces the signal representing the insufficiency of the residual voltage; and thereafter interrupting the supply of power from said power conversion means to said induction motor.

*15. A control method of an induction motor according to claim 1, further comprising prior to the tentative power supply step, the steps of determining that an initial interruption of the power supply has been finished, and determining that the residual voltage is substantially zero.*

*16. A control method of an induction motor according to claim 15, wherein the step of determining that the interruption of the power supply has been finished is effected prior to the step of determining that the residual voltage is substantially zero.*

*17. A method of controlling an induction motor when supply of power to the induction motor is interrupted, comprising the steps of:*

*(a) temporarily supplying power to the induction motor sufficient to enable the induction motor to generate a residual voltage of at least a predetermined value when the temporary supply of power is stopped; and*

*(b) uninterruptedly supplying power to the induction motor in accordance with the residual voltage.*

*18. A method according to claim 17, further comprising detecting the residual voltage of the induction motor when the temporary supply of power is stopped, and during the uninterrupted supply of power controlling the frequency of the power in accordance with a frequency of the detected residual voltage.*

*19. A method according to claim 17, wherein the induction motor is supplied with power from a power source through power conversion means capable of changing an output frequency and an output voltage thereof and when the supply of power from the power source is interrupted, the step of uninterruptedly supplying power to the induction motor includes resupplying power from the power conversion means to the induction motor.*

*20. A method according to claim 19, wherein the step of temporarily supplying power includes supplying power to the induction motor from the power conversion means.*

*21. A method according to claim 17, further comprising prior to the step of temporarily supplying power, the steps of determining that an interruption of the supply of power to the induction motor has been completed and that a residual voltage of the induction motor due to inertial rotation of the induction motor is substantially zero.*

*22. A method according to claim 21, wherein the step of determining that the interruption of the supply of power to the induction motor has been completed is effected prior to determining that the residual voltage is substantially zero.*

*23. A method according to claim 22, wherein the step of temporarily supplying power is effected when it is determined that the interruption of the supply of power has been completed and that the residual voltage of the induction motor is substantially zero and when it is determined that the interruption of the power supply has been completed and the residual voltage is not substantially zero, the step of uninterruptedly supplying power to the induction motor is effected.*

*24. A method according to claim 17, wherein the step of uninterruptedly supplying power includes detecting the residual voltages and supplying the power to the induction motor in accordance with the detected residual voltage.*

*25. A method of enabling control of an induction motor when supplying of power to the induction motor is interrupted, comprising the steps of:*

*(a) determining that the interruption of the supply of power has been completed and that a residual voltage of the induction motor due to inertial rotation of the induction motor is substantially zero; and*

*(b) temporarily supplying power to the induction motor sufficient to enable the induction motor to generate a residual voltage of at least a predetermined value when the temporary supply of power is stopped so as to enable control of the induction motor.*

*26. A method according to claim 25, further comprising the step of detecting the residual voltage of the induction motor when the temporary supply of power is stopped for enabling control of the induction motor in accordance therewith.*

*27. A method according to claim 26, further comprising the step of uninterruptedly supplying power to the induction motor in accordance with the detected residual voltage.*

*28. A method according to claim 27, wherein the step of uninterruptedly supplying power to the induction motor includes controlling the frequency of the power in accordance with a frequency of the detected residual voltage.*

*29. A method according to claim 26, wherein the power supplied to the induction motor is supplied from a power source through a power conversion means capable of changing an output frequency and an output voltage thereof, the supply of power from the power source being interrupted, and the step of uninterruptedly supplying power to the induction motor includes resupplying power from the power conversion means to the induction motor.*

*30. A method according to claim 27, wherein the step of temporarily supplying power to the induction motor includes supplying power from the power conversion means.*

*31. A method of controlling an induction motor when supply of power to the induction motor is interrupted, comprising the steps of:*

*(a) determining that the interruption of the supply of power has been completed and that a residual voltage of the induction motor due to inertial rotation of the induction motor is substantially zero; and*

(b) *temporarily supplying power to the induction motor sufficient to enable the induction motor to generate a residual voltage of at least a predetermined value when the temporary supply of power is stopped.*

*32. A method according to claim 31, further comprising the step of detecting the residual voltage of the induction motor when the temporary supply of power is stopped for enabling control of the induction motor in accordance therewith.*

*33. A method according to claim 32, further comprising the step of uninterruptedly supplying power to the induction motor in accordance with the detected residual voltage.*

*34. A method according to claim 33, wherein the step of uninterruptedly supplying power to the induction motor includes controlling the frequency of the power in accordance with a frequency of the detected residual voltage.*

*35. A method according to claim 32, wherein the power supplied to the induction motor is supplied from a power source through a power conversion means capable of changing an output frequency and an output voltage thereof, the supply of power from the power source being interrupted, and the step of uninterruptedly supplying power to the induction motor includes resupplying power from the power conversion means to the induction motor.*

*36. A method according to claim 35, wherein the step of temporarily supplying power to the induction motor includes supplying power from the power conversion means.*

*37. An apparatus for controlling an induction motor comprising:*

*means for supplying power to the induction motor;*

*means responsive to an interruption of the supply of power for temporarily supplying power to the induction motor sufficient to enable the induction motor to generate a residual voltage of at least a predetermined value when the temporary supply of power is stopped; and*

*means for uninterruptedly supplying power to the induction motor in accordance with the residual voltage.*

*38. An apparatus according to claim 37, further comprising means for detecting the residual voltage of the induction motor when the temporary supply of power is stopped for enabling control of the induction motor in accordance therewith.*

*39. An apparatus according to claim 38, wherein the means for uninterruptedly supplying power to the induction motor supplies power in accordance with the detected residual voltage.*

*40. An apparatus according to claim 39, wherein means for uninterruptedly supplying power to the induction motor includes means for controlling the frequency of the power in accordance with a frequency of the detected residual voltage.*

*41. An apparatus according to claim 37, wherein the means for supplying power includes a power source supply power through a power conversion means capable of changing an output frequency and an output voltage thereof, and when the supply of power from the power source is interrupted, the means for uninterruptedly supplying power to the induction motor including means for resupplying power from the power conversion means to the induction motor.*

*42. An apparatus according to claim 41, wherein the means for temporarily supplying power to the induction motor includes means for supplying power from the power conversion means.*

*43. An apparatus according to claim 42, wherein the power conversion means includes switching means and the means for temporarily supplying power includes means for controlling the switching means of the power conversion means.*

*44. An apparatus according to claim 37, further comprising means for determining that an interruption of the supply of power to the induction motor has been completed and that a residual voltage of the induction motor due to inertial rotation of the induction motor is substantially zero, the means for temporarily supplying power being responsive to the determining means.*

*45. An apparatus according to claim 44, wherein the detecting means includes first means for determining that the interruption of the supply of power to the induction motor is completed and second means for determining that the residual voltage is substantially zero which is responsive to the first means.*

* * * * *